US010440083B2

(12) United States Patent
Ramamurthy et al.

(10) Patent No.: US 10,440,083 B2
(45) Date of Patent: *Oct. 8, 2019

(54) METHODS AND DEVICES FOR EFFICIENT ADAPTIVE BITRATE STREAMING

(71) Applicant: Google Technology Holdings LLC, Mountain View, CA (US)

(72) Inventors: Arjun Ramamurthy, San Diego, CA (US); Ajay Luthra, San Diego, CA (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/987,667

(22) Filed: May 23, 2018

(65) Prior Publication Data
US 2018/0270285 A1 Sep. 20, 2018

Related U.S. Application Data

(63) Continuation of application No. 15/262,964, filed on Sep. 12, 2016, now Pat. No. 9,986,008, which is a (Continued)

(51) Int. Cl.
*G06F 15/16* (2006.01)
*H04L 29/06* (2006.01)
(Continued)

(52) U.S. Cl.
CPC .......... *H04L 65/602* (2013.01); *H04L 47/25* (2013.01); *H04L 65/4092* (2013.01);
(Continued)

(58) Field of Classification Search
CPC ....... H04L 65/60; H04L 65/80; H04L 65/607; H04N 21/23406; H04N 21/23424
See application file for complete search history.

(56) References Cited

U.S. PATENT DOCUMENTS 9,462,021 B2 * 10/2016 Ramamurthy .......... H04L 65/60
9,986,008 B2 * 5/2018 Ramamurthy .......... H04L 65/60
(Continued)

FOREIGN PATENT DOCUMENTS

WO WO 2004056028 7/2004
WO WO 2004097660 11/2004

OTHER PUBLICATIONS

International Preliminary Report on Patentability dated Apr. 2, 2015 in International Patent Application No. PCT/US2013/056977.
(Continued)

*Primary Examiner* — Yves Dalencourt
(74) *Attorney, Agent, or Firm* — Byrne Poh LLP

(57) ABSTRACT

Methods and systems for a content server to select sets of video streams having different encoding parameters for transmitting the sets of video streams to a media device are disclosed herein. In some embodiments, a method for transmitting video streams for a media program from a server to a media device includes: selecting, by the server, first encoding parameters including a first bitrate for a first set of video streams for the media program based on a first estimated bandwidth capacity for a network linking the server and the media device, transmitting the first set of video streams from the server to the media device, determining, by the server, second encoding parameters including a second bitrate for a second set of video streams for the media program, and transmitting the second set of video streams from the server to the media device.

18 Claims, 3 Drawing Sheets

Related U.S. Application Data continuation of application No. 13/939,314, filed on Jul. 11, 2013, now Pat. No. 9,462,021.

(60) Provisional application No. 61/812,256, filed on Apr. 16, 2013, provisional application No. 61/704,651, filed on Sep. 24, 2012.

(51) Int. Cl.
    *H04N 21/2343* (2011.01)
    *H04N 21/24* (2011.01)
    *H04N 21/6373* (2011.01)
    *H04N 21/6379* (2011.01)
    *H04N 21/647* (2011.01)
    *H04L 12/825* (2013.01)
    *H04N 21/6583* (2011.01)

(52) U.S. Cl.
CPC ....... *H04L 65/60* (2013.01); *H04N 21/23439* (2013.01); *H04N 21/234354* (2013.01); *H04N 21/234363* (2013.01); *H04N 21/2402* (2013.01); *H04N 21/6373* (2013.01); *H04N 21/6379* (2013.01); *H04N 21/64738* (2013.01); *H04N 21/6583* (2013.01)

(56) References Cited

U.S. PATENT DOCUMENTS

| | | |
|---|---|---|
| 2007/0236599 A1 | 10/2007 | Van Beek |
| 2008/0109865 A1 | 5/2008 | Su et al. |
| 2010/0235472 A1 | 9/2010 | Sood et al. |
| 2011/0043326 A1 | 2/2011 | Lee et al. |
| 2011/0125844 A1 | 5/2011 | Collier et al. |
| 2012/0066715 A1 | 3/2012 | Jain et al. |
| 2012/0079532 A1 | 3/2012 | Wong et al. |
| 2013/0038793 A1 | 2/2013 | Yoshida et al. |
| 2013/0227080 A1 | 8/2013 | Gao et al. |

OTHER PUBLICATIONS

International Search Report and Written Opinion dated Nov. 7, 2013 in International Application No. PCT/US2013/056977.
Notice of Allowance dated Jan. 29, 2018 in U.S. Appl. No. 15/262,964.
Notice of Allowance dated Jun. 6, 2016 in U.S. Appl. No. 13/939,314.
Office Action dated Mar. 17, 2016 in U.S. Appl. No. 13/939,314.
Office Action dated Jul. 19, 2017 in U.S. Appl. No. 15/262,964.
Office Action dated Aug. 27, 2015 in U.S. Appl. No. 13/939,314.
Office Action dated Oct. 18, 2017 in U.S. Appl. No. 15/262,964.
Pantos et al., "HTTP Live Streaming", Informational Internet-Draft Intented status, Mar. 31, 2011, pp. 1-48.

\* cited by examiner

METHODS AND DEVICES FOR EFFICIENT ADAPTIVE BITRATE STREAMING

CROSS-REFERENCE TO RELATED APPLICATIONS

This application is a continuation of U.S. patent application Ser. No. 15/262,964, filed on Sep. 12, 2016, which is a continuation of U.S. patent application Ser. No. 13/939,314, filed on Jul. 11, 2013, which claims the benefit of U.S. Provisional Patent Application No. 61/812,256, filed on Apr. 16, 2013, and U.S. Provisional Patent Application No. 61/704,651, filed on Sep. 24, 2012, each of which is hereby incorporated by reference herein in its entirety.

BACKGROUND

Streaming of media over a network from a content server to a media device has been widely adopted for media consumption. Two network protocols used for media streaming include the user datagram protocol Internet protocol ("UDP IP") and the transfer control protocol ("TCP") IP. The UDP IP is often used for media streaming for relatively reliable networks, such as in-home streaming over wired connections. The TCP IP is often used for streaming over less reliable networks.

The HTTP-based live streaming protocol, used with the TCP IP, allows a content server to publish variant playlist files to media devices. A variant playlist file identifies multiple sets video streams for a media program, such as a movie, a television program, etc., where each set of video streams has unique encoding parameters (e.g., bit rates, resolutions, etc.) for the media program. The media devices may dynamically switch between the sets of video streams identified in the variant playlist file as the sets of video streams are transmitted from the content server to the media devices. The media devices may choose to receive an initial set of video streams identified in the variant playlist file based on initial network conditions, initial buffer conditions, etc. For example, the media devices may choose to receive a set of high definition video streams identified in the variant playlist file if the initial network conditions, the initial buffer conditions, etc., support the streaming of the high definition set of video streams. If the initial network conditions degrade or if the initial buffer conditions degrade, etc., then the media devices may choose to receive a set of low definition video streams identified in the variant playlist file. That is, the media device may dynamically choose different sets of video streams to receive from the content server where the different sets of video streams have different encoding parameters.

Selection and transmission of the sets of video streams are driven by the media devices. In response to a selection of a set of video streams identified in the variant playlist file, the content server passively transmits the set of video streams to the media device. The media device may have limited information about the overall system conditions (e.g., network conditions to other media devices) and hence might not select a set of video streams that is suitable for the current media device's network conditions. Further, some types of media devices select the highest resolution and highest bit-rate sets of video streams to receive. Typically the content server services multiple media devices, transmitting multiple sets of video streams to the media devices. If a media device requests a set of video streams with high resolution and high bit rate, then a large portion of content server resources or network bandwidth may have to be allocated in order to service that media device. Consequently, the other media devices serviced by the content server may experience degraded performance such as intermittent interruptions in the transmission of video streams.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
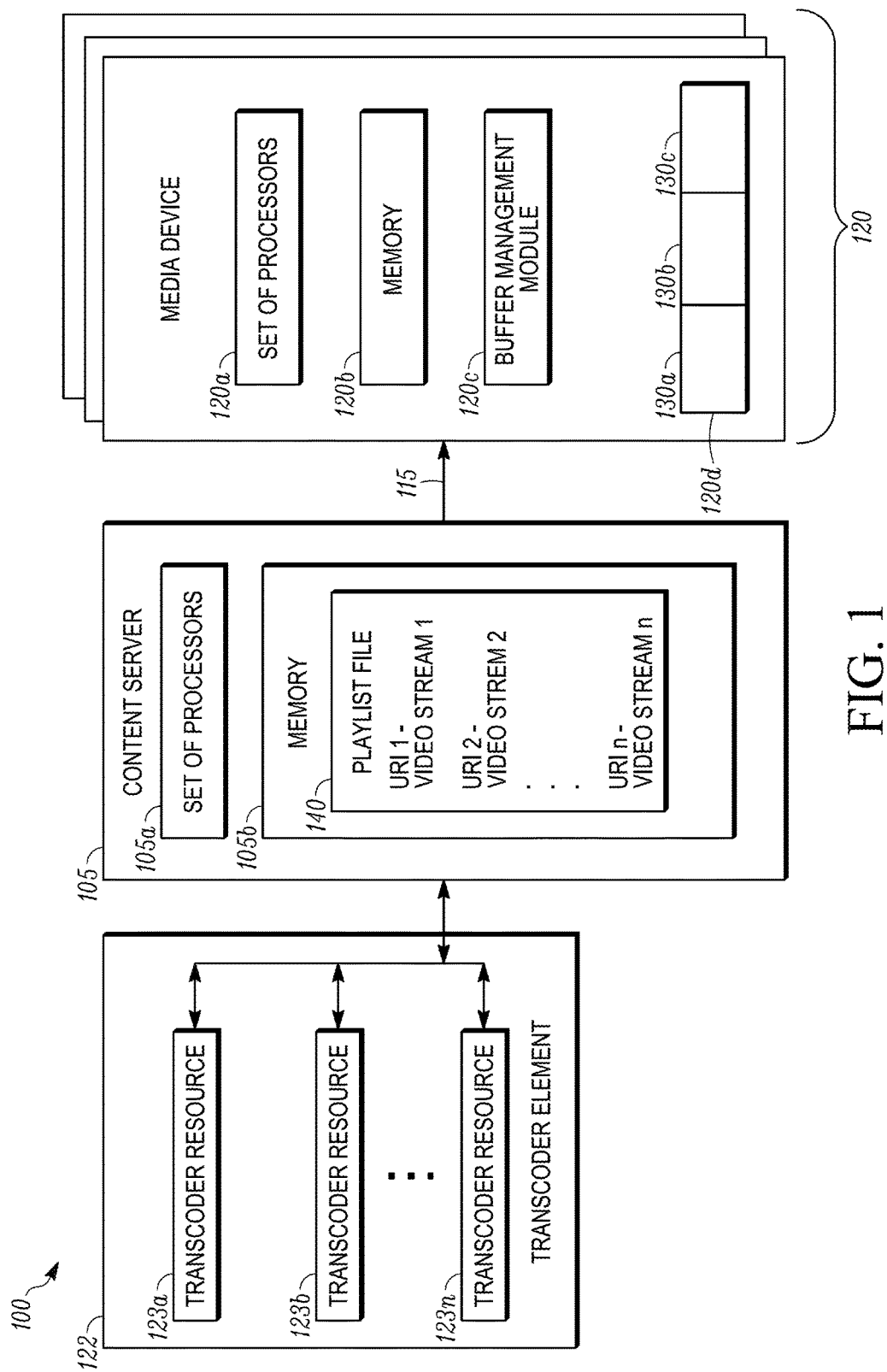
FIG. 1 depicts a video streaming system according to some embodiments.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Described herein are techniques for a content server to select sets of video streams having different encoding parameters for transmitting the sets of video streams to a media device. In the following description, for purposes of explanation, numerous examples and specific details are set forth in order to provide a thorough understanding of particular embodiments. Particular embodiments as defined by the claims may include some or all of the features in these examples alone or in combination with other features described below and may further include modifications and equivalents of the features and concepts described herein.

FIG. 1 depicts a video streaming system 100 according to one embodiment. The video streaming system 100 includes a content server 105, a network 115, a set of media devices 120, and a transcoder element 122. Content server 105 transmits sets of video streams to media devices 120 via network 115. A set of video streams may be for a media program, such as a movie, a television program, etc. Each video stream in a set of video streams may be a short segment of video (e.g., two second, ten seconds, etc.). A set of video streams may include thousands of video streams for a media program, such as a two-hour movie. The sets of video streams may be provided to content server 105 from transcoder element 122. Transcoder element 122 may include a number of transcoder resources 123 where each transcoder resource may provide a set of video streams having unique encoding parameters (e.g., a bit rate, a resolution, etc.). Network 115 may include the Internet, various intranets, etc. Network 115 may include wired links and wireless links. It is understood that the various references made herein to "media" and "video" include both video content and audio content.

Content server 105 may include a set of processors 105a and a non-transitory computer-readable storage medium (memory) 105b. Memory 105b may store instructions, which the set of processors 105a may execute to carry out various embodiments described herein. Content server 105 may include a number of computer devices that share a domain. Each media device 120 may include a set of processors 120*a* and a non-transitory computer-readable storage medium (memory) 120*b*. Memory 120*b* may store instructions, which the set of processors 120*a* may execute to carry out various embodiments described herein.

Each media device 120 may also include a buffer-management module 120*c* and a receive buffer 120*d*. Receive buffer 120*d* receives video packets for a set of video streams transmitted from content server 105 to media device 120 for a media program. The video packets may be retrieved by the set of processors 120*a* from receive buffer 120*d* as media device 120 consumes the video packets. As used herein, encoded content such as video packets may be divided into fixed-duration segments (e.g., chunks). The segments or chunks are typically between two and ten seconds in duration, although they may be longer or shorter. In some embodiments, shorter segments reduce coding efficiency, while larger segments impact speed to adapt to changes in network throughput.

In some embodiments, receive buffer 120*d* includes three buffer sections 130*a*, 130*b*, and 130*c*. First buffer section 130*a* may be for video packets that media device 120 has received from content server 105 but has not consumed for media play. Media device 120 may have acknowledged receipt of the video packets in first buffer section 130*a* to content server 105 via an acknowledgment. Buffer-management module 120*c* may monitor the rate at which video packets in first buffer section 130*a* are retrieved for consumption by media device 120.

Second buffer section 130*b* may be for video packets that media device 120 has received from content server 105 but has not consumed for media play. Media device 120 may not have sent acknowledgments to content server 105 for the video packets in second buffer section 130*b*. Portions of second buffer section 130*b* may be categorized as portion of first buffer section 130*a* as acknowledgments for video packets in second buffer section 130*b* are transmitted to content server 105 from media device 120. Buffer-management module 120*c* may track the portions of second buffer section 130*b* that are categorized as a portion of first video buffer 130*a* when media device 120 sends an acknowledgment to content server 105 for acknowledging receipt of the video packets in second buffer section 130*b*.

Third buffer section 130*c* may be available for receipt of video packets. Buffer management module 120*c* may monitor third buffer section 130*c* to determine when third buffer section 130*c* receives video packets and when third buffer section 130*c* is categorized as a portion of second buffer section 130*b*. Portions of first buffer section 130*a* may be categorized as a portion of third buffer section 130*b* as video packets from first buffer section 130*a* are consumed. That is, the portion of first buffer section 130*a* for which video packets are consumed may receive new video packets from content server 105.

The sizes of first, second, and third buffer sections 130*a* through 130*c* together define the maximum buffer size for video packet buffering according to some embodiments. The maximum buffer size may be allocated by media device 120 when opening an initial connection with content server 105. The maximum buffer size typically remains unchanged after the allocation.

The sizes of first, second, and third buffer sections 130*a* through 130*c* may vary relative to each other as video packets are received and consumed by media device 120. As described briefly above, the size of first buffer section 130*a* may vary depending on the rate at which the set of processors 120*a* retrieves video packets from first buffer section 130*a*. Variation of the size of the first buffer section 130*a* affects the sizes of second and third buffer sections 130*b* and 130*c*. For example, if media device 120 retrieves video packets from first buffer section 130*a* at a relatively high rate, first buffer section 130*a* may be relatively small, and second and third buffers sections 130*b* and 130*c* may be relatively large, as a result. Alternatively, if media device 120 retrieves video packets from first buffer section 130*a* at a relatively low rate, first buffer section 130*a* may be relatively large, and second and third buffers sections 130*b* and 130*c* may be relatively small, as a result.

The combined size of second and third buffer sections 130*b* and 130*c* defines a "current window size." According to some embodiments, media device 120 transmits the current window size to content server 105 in each communication (e.g., acknowledgment, request, etc.) that media device 120 sends to content server 105. The current window size informs content server 105 of the maximum number of video packets (e.g., TCP IP segments) that content server 105 may transmit to media device 120 before media device 120 transmits another communication (e.g., an acknowledgment) to content server 105. According to some embodiments, the current window size is transmitted in a header of each communication packet (e.g., TCP IP packet header) sent from media device 120 to content server 105. In an initial communication transmitted by media device 120 to content server 105, media device 120 may transmit an initial current window size and in subsequent communications may transmit updated current window sizes when the current window size changes from the initial window size. Content server 105 may store and track the current window size of media device 120.

According to further embodiments, content server 105 may estimate a current bandwidth capacity of network links of network 115 linking content server 105 and media device 120. Content server 105 may determine current bandwidth capacity via a variety of methods. For example, content server 105 may determine the amount of time it takes for the media device 120 to respond to each transmission that content server 105 sends to media device 120. Specifically, media device 120 may transmit an acknowledgment for each transmission received from content server 105. Content server 105 may determine a round-trip time from the time of transmission to the time of receiving an acknowledgement. Based on the round-trip time and how much data were transmitted, content server 105 may estimate the current bandwidth capacity between content server 105 and media device 120. Content server 105 may use additional information for estimating the current bandwidth capacity, such as the transmission bandwidth of content server 105.

In some embodiments, content server 105 may estimate the current bandwidth capacity by measuring the current bandwidth for each transmission that content server 105 sends to media device 120. In some embodiments, the current bandwidth is compared against a current bitrate for each transmission that content server 105 sends to media device 120. When the current bitrate is greater than that supportable by the current bandwidth, content server 105 decreases the current bitrate by setting a transcoder adjustment factor. When the current bitrate is less than supportable by the current bandwidth, content server 105 increases the current bitrate using the transcoder adjustment factor. As used herein, the transcoder adjustment factor is a fudge factor that accounts for the fact that when sent a command to create a certain outcome, a transcoder may not necessarily produce the desired certain outcome.

Content server 105 may generate a number of playlist files 140 for the sets of video streams that may be provided by transcoder resources 123. Each playlist file 140 may include uniform resource identifiers ("URIs") for the video streams generated by transcoder resource 123. Each playlist file 140 is for a set of video streams having unique encoding parameters (e.g., bit rate, resolution, etc.) according to one embodiment. The encoding parameters for resolution may include QVGA, HVGA, VGA, 480p30, and 720p30 resolutions. The encoding parameters for bitrate may be from 200 Kbps to 5 Mbps, for example. For example, a first playlist file 140 may be for a first set of video streams for a media program having encoding parameters of 480p30 resolution and a 3 Mbps bit rate, a second playlist file 140 may be for a second set of video streams for the media program having 720p30 resolution and a 3 Mbps bit rate, a third playlist file 140 may be for a third set of video streams for the media program having 720p30 resolution and a 5 Mbps bit rate, etc.

While content server 105 provides a set of video streams for a media program to media device 120, content server 105 may change the particular set of video streams that content server 105 transmits to media device 120 where the two sets of video streams may have different encoding parameters (e.g., resolutions, bit rates, etc.). For example, as content server 105 provides a set of video streams for a media program to media device 120, content server 105 may change the particular set of video streams transmitted to media device 120 to change the resolution and the bit rates of the set of video streams to adjust to changes in the current window size of receive buffer 120*d* or the current bandwidth capacity of networks links linking content server 105 and media device 120.

According to some embodiments, if the current bandwidth capacity between content server 105 and media device 120 is reduced, content server 105 may switch from transmitting high bit rate (e.g., 3 Mbps rate) video streams to transmitting lower bit rate (e.g., 500 Kbps) video streams to accommodate the reduced current bandwidth capacity. Content server 105 may also switch from transmitting a high resolution (e.g., 720p30) set of video streams to transmitting a lower resolution (e.g., VGA) set of video streams. Conversely, if the current bandwidth capacity between content server 105 and media device 120 increases, content server 105 may switch from transmitting a low bit rate (e.g., 500 Kbps) set of video streams to transmitting a higher bit rate (e.g., 2 Mbps) set of video streams to accommodate the increased current bandwidth capacity. Content server 105 may also switch from transmitting a low resolution (e.g., VGA) set of video streams to transmitting a higher resolution (e.g., 720p30) set of video streams.

According to some embodiments, if the current window size for receive buffer 120*d* is lowered by media device 120 as media device 120 receives a set of video streams for a media program, content server 105 may switch from transmitting a high bit rate (e.g., 3 Mbps rate) set of video streams to transmitting a lower bit rate (e.g., 500 Kbps) set of video streams to accommodate the reduced current window size. On the other hand, if the current window size for receive buffer 120*d* is increased by media device 120 as media device 120 receives a set of video streams, content server 105 may switch from transmitting a low resolution set of video streams to transmitting a higher resolution set of video streams to accommodate the increased current bandwidth capacity. Content server 105 may similarly switch from transmitting high or low resolution sets of video streams to transmitting lower or higher resolution sets of video streams, respectively, to adjust to reduced or increased current window sizes. Content server 105 may change the set of video streams transmitted to media device 120 at packet boundaries, key frame boundaries, or other locations in the media program where a change in the set of video streams is least likely to be noticed by a user.

In accordance with the present disclosure, the set of video streams chosen by content server 105 for transmission may have encoding parameters including a first bitrate, where the encoding parameters are based on a first estimated bandwidth capacity for a network linking the server 105 and the media device 120. Thereby, media device 120 may consume a set of video streams that are delivered at a resolution, bitrate, etc., that are suited for the current bandwidth capacity. According to an alternative embodiment, the encoding parameters may be set to a level lower than is permitted by the current bandwidth capacity. This provides some headroom, allowing for the current bandwidth capacity to drop lower, yet still ensure that the transmission of the set of video streams continues without unexpected degradation, pauses, dropped video packets, etc.

According to some embodiments, content server 105 may dynamically request that the set of video streams provided to content server 105 from transcoder element 122 have the encoding parameters determined by content server 105. According to one embodiment, content server 105 may dedicate one transcoder resource 123 included in transcoder element 122 to media device 120. The dedicated transcoder resource 123 may then provide the set of video streams to content server 105 for subsequent transmission to media device 120.

In some embodiments, content server 105 determines second encoding parameters including a second bitrate for a second set of video streams. This information is sent to the transcoder resource 123 to generate the second set of video streams on demand. Media device 120 may consume the second set of video streams that are delivered at a resolution, bitrate, etc., that are suited for the current bandwidth capacity.

In some embodiments, the first and second video streams include a plurality of video packets that are formed from one or more predetermined segment sizes and that are configured to be received by and stored in receive buffer 120*d* of media device 120. The second encoding parameters may be determined based on the number of video packets in the first set of video streams that has been received by the media device 120. For example, the number of video packets in the first set of video streams that has been received by media device 120 determines the fullness of receive buffer 120*d*. In addition, the second encoding parameters may be determined further based on the download rate at which the number of video packets in the first set of video streams have been received by the media device 120.

In some embodiments, the download rate at which the number of video packets in the first set of video streams has been received by the media device 120 is determined by content server 105. Content server 105 may determine the desired subsequent media bitrates and resolutions based on the download rate, on the fullness of the receive buffer 120*d*, and on a minimum time duration for unstalled playback of video streams. The minimum time duration for unstalled playback is herein defined as the minimum media duration buffered by the media device 120 (e.g., 2 to 4 seconds).

In some embodiments, if the estimated download rate is greater than zero, then content server 105 determines whether a new bitrate is greater than a maximum allowable bitrate. The maximum allowable bitrate is herein defined as the combination of the highest bitrate and resolution used to support best viewing experience of a specific media device 120 and may be preset by content server 105. If the new bitrate is greater than the maximum allowable bitrate, then content server 105 dials down the bitrate for the second set of video streams with a corresponding second bitrate for the second set of video streams. If the new bitrate is less than the maximum allowable bitrate, content server 105 determines the second bitrate for the second set of video streams based on the predetermined segment size.

In some embodiments, if the estimated download rate is less than zero, then content server 105 determines a new segment size for the second set of video streams and the corresponding second bitrate for the second set of video streams. In this scenario, a pre-created alternative media representation is used. If this alternative media segment is unavailable, a low bitrate audio-only stream is served to the media device 120.

In general, if the estimated download rate is greater than zero and content server 105 determines a new segment size for the second set of video streams, then the new segment size is greater than the previous segment size, e.g., the segment size has been increased. Similarly, if the download rate is less than zero, then the new segment size is less than the previous segment size, e.g., the segment size has been decreased.

Content server 105 may generate a playlist file 140 for the set of video streams for transmission to media device 120. If content server 105 determines that a different set of video files having different encoding parameters are to be transmitted to media device 120, content server 105 may generate a new playlist file 140 for the different set of video files. Different playlist files 140 may include different lists of URIs for different sets of video streams for the media program. The video streams identified in one playlist file 140 have the same encoding parameters (resolution, bit rate, etc.). Content server 105 may include playlist file 140 in each transmission that content server 105 transmits to media device 120. If the current bandwidth capacity from content server 105 to media device 120 changes or if the current window size of receive buffer 120*d* changes, then content server 105 may determine a different set of video streams to transmit to media device 120 based on the changes. The different set of video streams have different encoding parameters (e.g., higher or lower resolution, higher or lower bit rate, etc.) which may be better suited for the changes to the current bandwidth capacity or the changes to the current window size. Content server 105 may request that the transcoder element 122 provides the different set of video streams to content server 105. Content server 105 may transmit a different playlist file 140 for the different set of video streams to media device 120 so that media device 120 may retrieve the different video streams.

In some embodiments, each media device in the set of media devices 120 may be prohibited from selecting encoding parameters for its downloads. This prevents any one media device 120 from selecting encoding parameters that could consume network bandwidth and content server resources to the detriment of the other media devices 120. Instead, content server 105 may control the sets of video streams that each media device 120 receives. The content server 105 may also perform load balancing based on current bandwidth capacities for all of the media devices 120 and may load balance based on the current buffer windows of all of the media devices 120 where each media device 120 might not know the current buffer windows of other media devices 120.

According to some embodiments, content server 105 may track the current bandwidth capacities or the current window sizes of a number of media devices 120. Content server 105 may determine a playlist file to transmit to each media device 120 based on the current bandwidth capacity or on the current window size for the media device 120. Content server 105 may dedicate one transcoder resource 123 to a number of media devices 120, where transcoder resource 123 may provide a number (e.g., five, ten, fifteen, etc.) of sets of video streams having different encoder parameters.

In some embodiments, the current bandwidth for the first set of video streams is determined by estimating the bandwidth using a fraction of the predetermined media chunk size in the first set of video streams. The fraction of the predetermined segment size is adaptable based on the total chunk size. For example, it may be anywhere from 10% to 100% of the total chunk size.

According to some embodiments, content server 105 may dynamically change the temporal lengths of the video streams transmitted to media device 120 based on the current bandwidth capacity, the current window size, or other information. For example, content server 105 may create and transmit initial playlist file 140 that includes URIs for ten-second video streams and may thereafter generate and transmit a subsequent playlist file 140 that includes URIs for three-second video streams based on the current bandwidth capacities or the current window sizes to provide optimal transmission of the set of video streams to media device 120. As described above, content server 105 may generate and transmit the subsequent playlist file 140 dynamically as a set of video streams is transmitted and as conditions change for the current bandwidth capacity. Dynamic changes to playlist files 140 may include changes in the temporal lengths of the video streams. For example, the initial playlist file may include an initial number of identifiers for a first set of video streams that are each ten seconds in length, and the subsequent playlist file may include a larger number of identifiers for a second set of video stream that are each three seconds in length.

Figure 2:
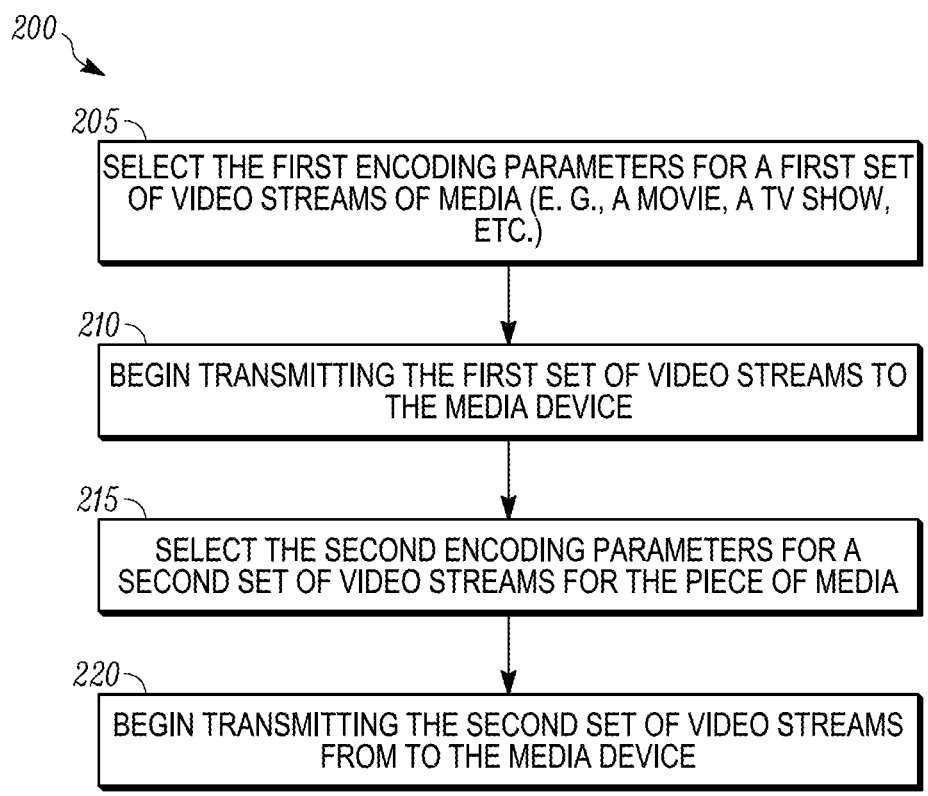
FIG. 2 depicts a high-level flow diagram of a method for transmitting sets of video streams for a media program from a content server to a media device according to some embodiments.

FIG. 2 depicts a high-level flow diagram of a method 200 for transmitting sets of video streams for a media program from content server 105 to media device 120 according to some embodiments. The high-level flow diagram represents an example embodiment, and those of skill in the art understand that various steps of the high-level flow diagram may be combined or added without deviating from the scope and the purview of the embodiment.

At 205, content server 105 selects first encoding parameters for a first set of video streams for the media program (e.g., a movie, a TV show, etc.). The first encoding parameters include a first bitrate, among other things. Content server 105 selects the first encoding parameters based on a first estimated bandwidth capacity for network 115 linking content server 105 and media device 120. Content server 105 may select the first encoding parameters to optimally use the first estimated bandwidth capacity for transmitting the set of video streams to media device 120.

At 210, content server 105 begins transmitting the first set of video streams to media device 120 across network 115. The set of video stream may be transmitted from content server 105 to media device 120 based on requests for the video streams transmitted from media device 120 to content server 105 where the requests may include identifiers (e.g., URIs) included in playlist file 140 for the set of video streams. The current bandwidth capacity of network 115 may change based on a variety of conditions, such as changing network traffic. The first current window size of receive buffer 120d may also change based on a variety of conditions, such as media device 120 performing other operations.

At 215, content server 105 determines (and selects) the second encoding parameters for a second set of video streams for the media program. The second encoding parameters include a second bitrate, among other things. Content server 105 may select the second encoding parameters based on the fullness of receive buffer 120d. Content server 105 may select the second encoding parameters additionally based on the download rate at which the number of video packets in the first set of video streams has been received by media device 120.

At 220, content server 105 begins transmitting the second set of video streams to media device 120. The quality of the media program consumed by media device 120 may increase and decrease with the different sets of video streams transmitted to media device 120. However, because the sets of video streams are selected based on bandwidth capacity of network 115, the video streams may be optimized for the current conditions, and the sets of video streams may be transmitted with little or no network packets being dropped and with little or no interruption of consumption of the sets of video streams by media device 120.

According to some embodiments, content server 105 receives the first current window size and the second window size in transmissions transmitted from media device 120. The transmissions may be initial transmissions to establish a transmission session, acknowledgments for received transmissions, etc. Media device 120 may include information for current window size in each transmission (acknowledgement) that media device 120 sends to content server 105.

Method 200 may be executed a number of times simultaneously by content server 105 for a number of media devices 120. Content server 105 may track current window sizes and current bandwidth capacities for the number of media devices 120 and may change the set of video streams transmitted to each media device 120 in the number of media devices independently based on the current window size and the current bandwidth capacity for each media device 120. That is, content server 105 may chose encoding parameters for the sets of video streams to optimize the transmissions of the sets of video streams. According to an alternative embodiment, method 200 and other embodiments described herein are executed in whole or in part by a proxy server that is a server gateway between content server 105 and media device 120.

Figure 3:
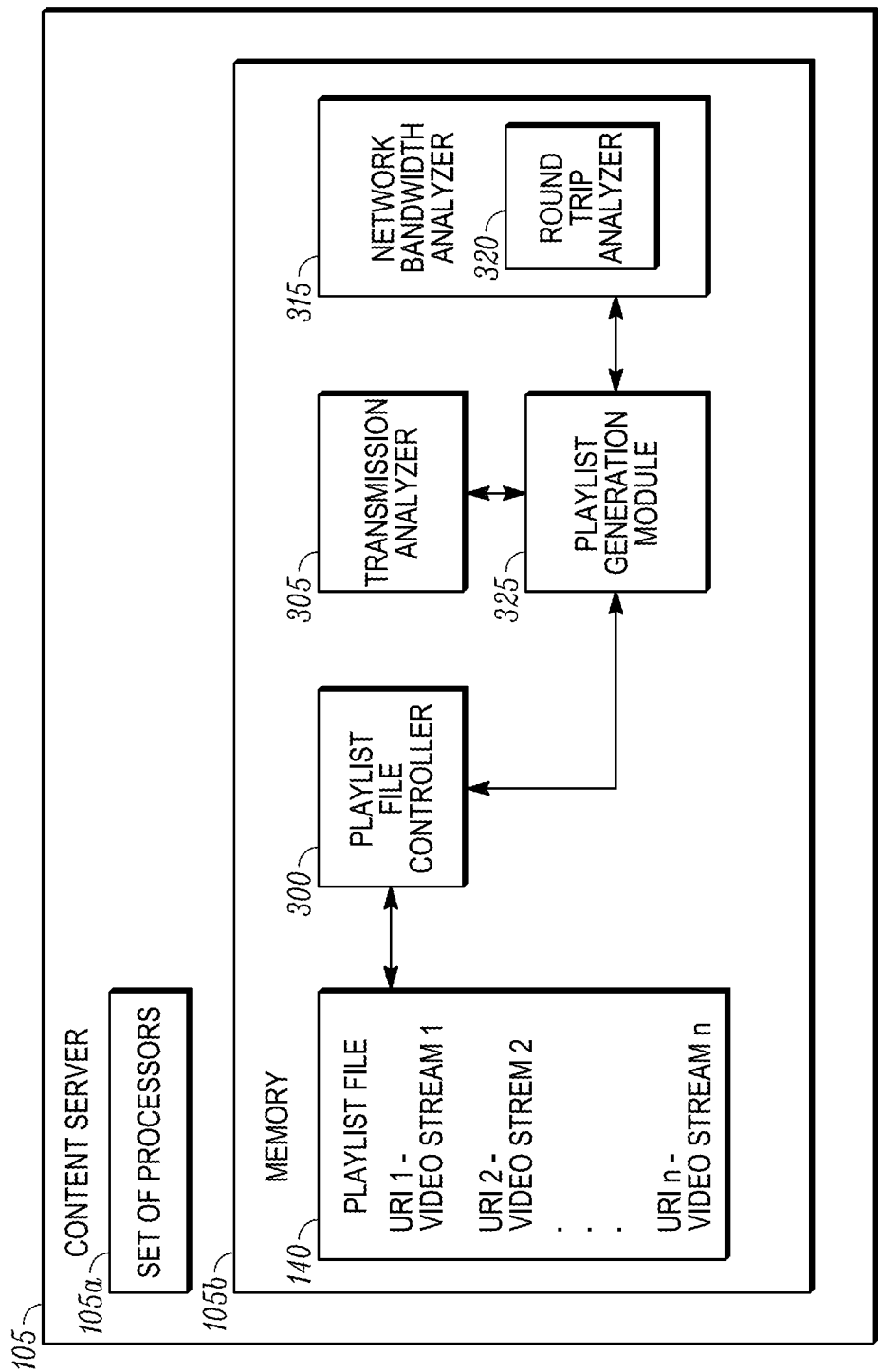
FIG. 3 depicts software elements of a content server according to some embodiments.

FIG. 3 depicts software elements of content server 105. Content server 105 may include a playlist-file controller 300 for storing playlist files 140 in memory 105b and for reading playlist files 140 from memory 105b. Content server 105 may include a transmission analyzer 305 for extracting information for current window size from transmissions received by content server 105 from media device 120. Content server 105 may also include a network-bandwidth analyzer 315 that estimates the current bandwidth capacity between content server 105 and media device 120. Network-bandwidth analyzer 315 may include a round-trip analyzer 320 that determines round-trip times of sets of transmissions transmitted between content server 105 and media device 120. Network-bandwidth analyzer 315 may determine current bandwidth capacity of network links of network 115 linking content server 105 and media device 120 based on the round-trip times generated by round-trip analyzer 320.

Transmission analyzer 305 may provide the current window size to a playlist-generation module 325, and network-bandwidth analyzer 315 may provide the current bandwidth capacity to playlist-generation module 325. Playlist-generation module 325 may use the current window size and the current bandwidth capacity to determine a set of video streams to transmit to media device 120 where the set of video streams has a set of encoding parameters for the current bandwidth capacity and for the current window size of receive buffer 120d. Playlist-generation module 325 may also generate playlist file 140 for the set of video streams. The generated playlist file 140 is stored in memory by playlist-file controller 300. Content server 105 configures the transcoder resources 123 accordingly to generate the desired media chunks.

An example implementation follows. In some embodiments, a method to measure the bandwidth at the TCP-IP level at "sub-segment" intervals is disclosed. This gives the server 105 the benefit to pro-actively act upon changing network bandwidth. Additionally, based on the estimated buffer depth or buffer fullness and on a transcoder adjustment factor, a new segment bitrate is determined. A command is sent to the transcoder elements 122 and the content server 105 is configured accordingly to generate the corresponding playlist information.

In some embodiments, the following methods can be used in both a one-to-one adaptive bitrate transcoding and one-to-many adaptive bitrate statistical multiplexing scenarios. The following methods adopt the common principle of rapid fall during bitrate downshift and slow, gradual rise during bitrate upshift. Also, in general, the methods can change segment durations less frequently, e.g., once for multiple segment durations.

The following terms are defined for ease in explanation of Method 1:

$BW_{estimated}$ is the estimated bandwidth.
$R_{currentBitrate}$ is the bitrate of the current chunk.
$BW_{projected}$ is the projected bandwidth.
$R_{newBitrate}$ is the bitrate used for the next chunk.

```
#define MAX_ALLOWABLE_BITRATE              6000 // in bits per second (bps)
#define MAX_BITRATE_WITH_XCODE_FUDGE_FACTOR  5200 //bps
BW_estimated = getCurrentBandwidth( );
if(BW_estimated <= R_currentBitrate)
{
    // a coarse estimation of client buffer based on empirical data
    BW_projected = BW_estimated >> 1;
    // a rapid fall and coarse estimation of transcoder fudge factor
    BW_projected = BW_projected >> 1;
```

```
                    if(R_currentBitrate <= MAX_ALLOWABLE_BITRATE)
                        R_newBitrate = R_currentBitrate = BW_projected;
                } else
                {
                    if(R_currentBitrate < MAX_ALLOWABLE_BITRATE)
                    {
                        // 12.5% is the step size
                        BW_projected = R_currentBitrate + (R_currentBitrate >>3);
                        // transcoder fudge factor of 33%
                        if(BW_estimated > (BW_projected + BW_projected/3))
                            // increase with transcoder fudge factor
                            R_newBitrate = R_currentBitrate = BW_projected;
                    } else
                    {
                        R_newBitrate = MAX_BITRATE_WITH_XCODE_FUDGE_FACTOR;
                        R_currentBitrate=MAX_BITRATE_WITH_XCODE_FUDGE_FACTOR;
                    }
                }
            }
```

The following terms are defined for ease in explanation of Method 2:

$T_{create}$ is the time it takes to transcode the media chunk.

$T_{chunkDuration}$ is the duration of the new chunk.

$T_{downloadRate}$ is the estimated time to download the media chunk being created.

$B_{totalAvailableBits}$ is the total available bits to create the new media chunk.

XcodeSpeedFactor is the speed of transcoding. This could be real-time or faster than real-time.

sendCommand2Transcoder (fudgeFactor, $R_{newBitrate}$, $T_{chunkDuration}$);

Both the above methods use a measurement window for bandwidth estimation as described below in Method 3. As used herein, the measurement window is the minimum number of bytes to be downloaded by the media device 120, after which the content server 105 makes the bandwidth calculation. It is defined by total chunk size ($B_{totalChunkSize}$) divided by the scale factor ($K_{scaleFactor}$).

```
//Based on the device, the following value is set.
#define MIN_TIME_DURATION_FOR_UNSTALLED_PLAYBACK    3 // in seconds
function compute estimated T_downloadRate( )
{
    BW_estimated = getCurrentBandwidth( );
    bufferDepth = getClientBufferDepth( );
    T_create = T_chunkDuration (in secs)/XcodeSpeedFactor;
    T_downloadRate = bufferDepth -
    MIN_TIME_DURATION_FOR_UNSTALLED_PLAYBACK - T_create ;
    if(T_downloadRate > 0)
    {
        B_totalAvailableBits = T_downloadRate × BW_estimated;
        R_newBitrate = B_totalAvailableBits / T_chunkDuration;
        if(R_newBitrate > (MAX_ALLOWABLE_BITRATE<<1))
        {
            T_chunkDuration++;
            computeT_downloadRate( );
            exit;
        }
    } else
    {
        // decrease T_chunkDuration
        T_chunkDuration--;
        if(T_chunkDuration > 0)
        {
            computeT_downloadRate( );
            exit;
        }
        if(alternate representation available)
        {
            // configure packager to publish alternate representation chunks
            R_newBitrate = lowestPermisableBitrate(withAltRep);
            T_chunkDuration= lowestCorrespondingChunkDuration(withAltRep);
        } else
        {
            // playback stall detected
            // use lowest permissible bitrate, could be audio-only too
            R_newBitrate = lowestPermissibleBitrate(withoutAltRep);
            // would be 1 second for video. Can be > 1 second for audio only
            T_chunkDuration= lowestCorrespondingChunkDuration(withoutAltRep);
        }
    }
}
``` if ($B_{totalChunkSize}$<=180000)
    $K_{scaleFactor}$=1.2;
else if ($B_{totalChunkSize}$>180000 && $B_{totalChunkSize}$<=350000)
    $K_{scaleFactor}$=1.3;
else if ($B_{totalChunkSize}$>350000 && $B_{totalChunkSize}$<=500000)
    KscaleFactor=1.4;
else if ($B_{totalChunkSize}$>500000 && $B_{totalChunkSize}$<=600000)
    $K_{scaleFactor}$=1.6;
else if ($B_{totalChunkSize}$>600000 && $B_{totalChunkSize}$<=750000)
    $K_{scaleFactor}$=2;
else if ($B_{totalChunkSize}$>750000 && $B_{totalChunkSize}$<=1000000)
    $K_{scaleFactor}$=2.3;
else if ($B_{totalChunkSize}$>1000000 && $B_{totalChunkSize}$<=1250000)
    $K_{scaleFactor}$=2.8;
else $K_{scaleFactor}$=3;
$B_{totalChunkSize}$ is in Bytes.

The $K_{scaleFactor}$ is for 2-second long segments. This $K_{scaleFactor}$ might change with varying segment durations. A benefit of this method is that it is not necessary to wait until the entire segment is downloaded to compute the bandwidth capacity. Instead an adaptive algorithm is used where the measurement window is a function of the $B_{totalChunkSize}$ and $K_{scaleFactor}$. As illustrated in Method 3, the measurement window (size in bytes) changes for different total chunk sizes. For example, if the total chunk size is greater than 600 KB and less than 750 KB, the scale factor is 2 (e.g., the measurement window=$B_{totalChunkSize}$/$K_{scaleFactor}$). Hence, for varying chunk sizes, the scale factor changes, and accordingly the measurement window (size in bytes) adapts.

In some embodiments, the device profile is also considered in the decision-making in both Method 1 and 2 approaches. This supports optimized streaming for the device and promotes an appropriate MAX_ALLOWABLE_BITRATE to avoid playback stalls.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. A method for transmitting video streams for media programs, the method comprising:
    calculating, at a server, a first estimated bandwidth capacity for a first network connecting the server and a first media device;
    calculating, at the server, a second estimated bandwidth capacity for a second network connecting the server and a second media device;
    selecting, by the server, first encoding parameters including a first temporal length for a first set of video streams for a media program to be presented on the first media device based on the first estimated bandwidth capacity and the second estimated bandwidth capacity; and
    transmitting the first set of video streams as a plurality of video streams, each having a duration corresponding to the first temporal length selected by the server, from the server to the first media device.

2. The method of claim 1, further comprising receiving, from the first media device, an indication of an amount of data corresponding to the first set of video streams remaining in a buffer of the first media device in connection with acknowledgement of receipt of the first set of video streams.

3. The method of claim 2, further comprising:
    determining updated encoding parameters based on the amount of data remaining in the buffer of the first media device; and
    transmitting, to the first media device, a second set of video streams using the updated encoding parameters.

4. The method of claim 3, wherein transmitting the second set of video streams using the updated encoding parameters comprises selecting a playlist file corresponding to the second set of video streams, wherein the playlist file encodes the second set of video streams using a resolution corresponding to the updated encoding parameters and a bitrate corresponding to the updated encoding parameters.

5. The method of claim 3, wherein each video stream in the second set of video streams has a second temporal length different than the first temporal length.

6. The method of claim 1, wherein the first encoding parameters are selected to be suitable for a bandwidth capacity lower than the first estimated bandwidth capacity.

7. A system for transmitting video streams for media programs, the system comprising:
    a memory; and
    a hardware processor that, when executing computer executable instructions stored in the memory, is configured to:
        calculate a first estimated bandwidth capacity for a first network connecting a server and a first media device;
        calculate a second estimated bandwidth capacity for a second network connecting the server and a second media device;
        select first encoding parameters including a first temporal length for a first set of video streams for a media program to be presented on the first media device based on the first estimated bandwidth capacity and the second estimated bandwidth capacity; and
        transmit the first set of video streams as a plurality of video streams, each having a duration corresponding to the first temporal length selected by the server, from the server to the first media device.

8. The system of claim 7, wherein the hardware processor is further configured to receive, from the first media device, an indication of an amount of data corresponding to the first set of video streams remaining in a buffer of the first media device in connection with acknowledgement of receipt of the first set of video streams.

9. The system of claim 8, wherein the hardware processor is further configured to:
    determine updated encoding parameters based on the amount of data remaining in the buffer of the first media device; and
    transmit, to the first media device, a second set of video streams using the updated encoding parameters.

10. The system of claim 9, wherein transmitting the second set of video streams using the updated encoding parameters comprises selecting a playlist file corresponding to the second set of video streams, wherein the playlist file encodes the second set of video streams using a resolution corresponding to the updated encoding parameters and a bitrate corresponding to the updated encoding parameters.

11. The system of claim 9, wherein each video stream in the second set of video streams has a second temporal length different than the first temporal length.

12. The system of claim 7, wherein the first encoding parameters are selected to be suitable for a bandwidth capacity lower than the first estimated bandwidth capacity.

13. A non-transitory computer-readable medium containing computer executable instructions that, when executed by a processor, cause the processor to perform a method for transmitting video streams for media programs, the method comprising:

calculating a first estimated bandwidth capacity for a first network connecting a server and a first media device;

calculating a second estimated bandwidth capacity for a second network connecting the server and a second media device;

selecting first encoding parameters including a first temporal length for a first set of video streams for a media program to be presented on the first media device based on the first estimated bandwidth capacity and the second estimated bandwidth capacity; and transmitting the first set of video streams as a plurality of video streams, each having a duration corresponding to the first temporal length selected by the server, from the server to the first media device.

14. The non-transitory computer-readable medium of claim 13, wherein the method further comprises receiving, from the first media device, an indication of an amount of data corresponding to the first set of video streams remaining in a buffer of the first media device in connection with acknowledgement of receipt of the first set of video streams.

15. The non-transitory computer-readable medium of claim 14, wherein the method further comprises:

determining updated encoding parameters based on the amount of data remaining in the buffer of the first media device; and transmitting, to the first media device, a second set of video streams using the updated encoding parameters.

16. The non-transitory computer-readable medium of claim 15, wherein transmitting the second set of video streams using the updated encoding parameters comprises selecting a playlist file corresponding to the second set of video streams, wherein the playlist file encodes the second set of video streams using a resolution corresponding to the updated encoding parameters and a bitrate corresponding to the updated encoding parameters.

17. The non-transitory computer-readable medium of claim 15, wherein each video stream in the second set of video streams has a second temporal length different than the first temporal length.

18. The non-transitory computer-readable medium of claim 13, wherein the first encoding parameters are selected to be suitable for a bandwidth capacity lower than the first estimated bandwidth capacity.

* * * * *